Improved

DRILLING MACHINE

117896

John Lemman
Assignor to
Hamilton Bates &
Daniel L. Bates

Patented Aug 8 1871

Attest

UNITED STATES PATENT OFFICE.

JOHN LEMMAN, OF CINCINNATI, ASSIGNOR TO HAMILTON BATES AND DANIEL L. BATES, OF DAYTON, OHIO.

IMPROVEMENT IN DRILLING-MACHINES.

Specification forming part of Letters Patent No. 117,896, dated August 8, 1871.

*To all whom it may concern:*

Be it known that I, JOHN LEMMAN, of Cincinnati, Hamilton county, State of Ohio, have invented a certain new and useful Improvement in Drilling-Machines, of which the following is a specification:

My invention consists of a peculiar combination of bevel-gearing and connection to a drilling-machine spindle, by which the speed of the spindle can be changed with relation to the speed of the hand-crank or driving-shaft for the purpose of enabling the drill to be driven with more or less power in proportion to the work to be done.

Figure 1:
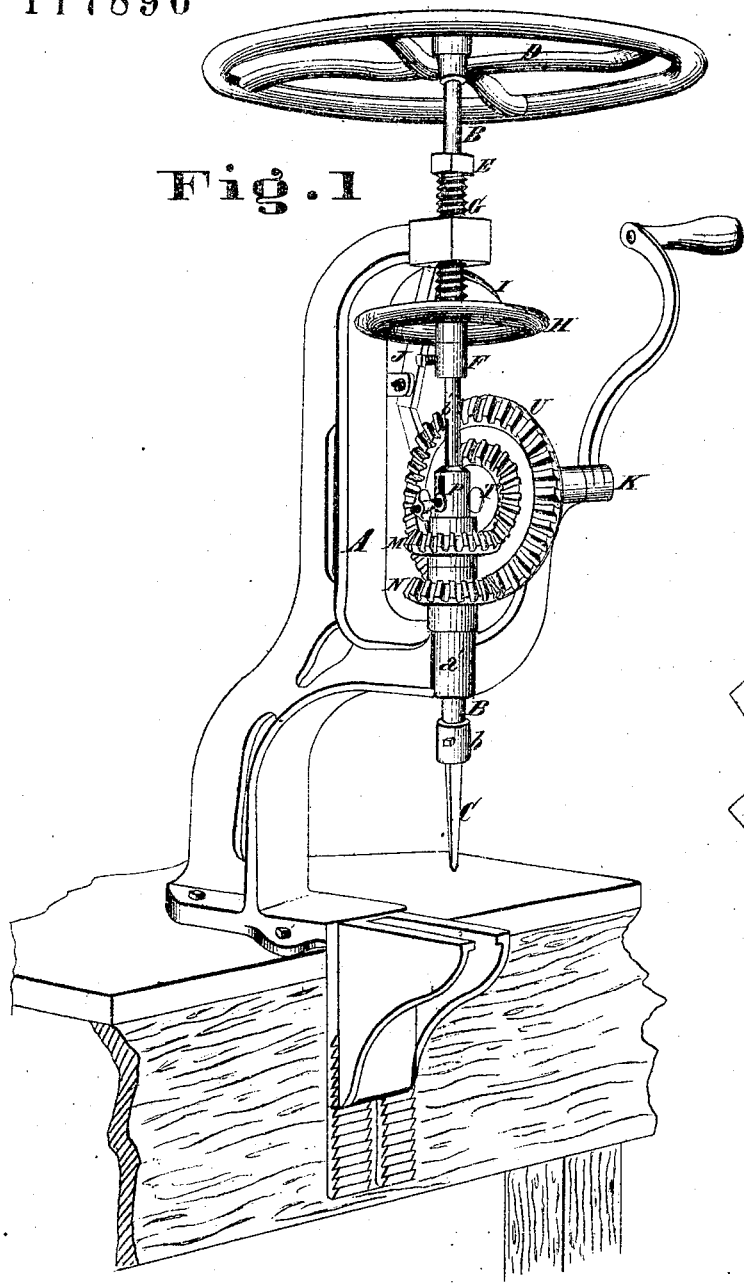
Figure 2:
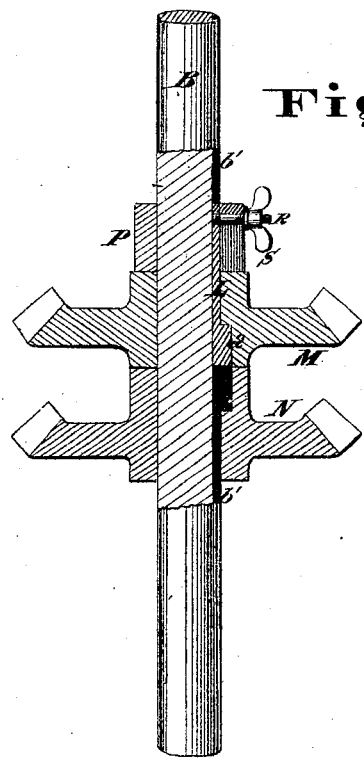

Figure 1 is a perspective view of a machine embodying my invention. Fig. 2 is an enlarged vertical section of the gearing attached to the spindle.

A is the frame of the machine, and B the drill-spindle. The spindle is constructed at one end with a socket, $b$, for the drill C, and at the opposite end with a fly-wheel, D, to render the power over the drill nearly uniform. The latter, however, is only needed when the machine is driven by hand or foot. The spindle is also fitted with collars E F, between which the hollow screw-spindle G operates which feeds the drill, the screw working in a nut or screw-thread in the frame A and operated by hand-wheel H by hand, or pawl-feed I J operated in the usual way with hand-drills by the crank-shaft K. The spindle is also grooved, as shown at $b'$, to receive the "feather" L, which drives it, the groove being sufficiently long to permit the spindle to move up and down on the feather L thoughout the vertical range desired for the drill. The bevel-wheels M N are fitted to revolve loosely upon the spindle B, being also key-seated to receive the head $a$ of the feather L. The wheels M N rest upon the socket $a'$ of the frame, and a loose collar, P, rests upon the upper wheel. The feather L is adapted to be moved up and down, so that the head $a$ may be moved from one to the other of the key-seats in the wheels M N, and is secured in either position by pin or bolt R and thumb-nut S, the bolt or pin passing through a slot in the collar P, to which the feather is secured. To the crank-shaft or driving-shaft K two bevel-wheels, T U, of unequal sizes, as shown, are rigidly secured. These wheels may be cast in one piece, if preferred. They gear into the wheels M N in the manner shown.

When the feather L $a$ is in the position shown in Fig. 2, the spindle is operated solely by the wheels T M, and in this condition the machine is best adapted for slow heavy work where considerable power is necessary. When the feather is moved so that the head $a$ is seated in the wheel N the spindle is operated by the wheels U N, and the wheel M runs loose on the spindle. In this condition the machine is best adapted for fast, light work.

I claim—

In combination with the solid grooved spindle B $b'$ and loose wheels M N, which gear into and are driven by the differential wheels T U, the adjustable feather L $a$, set-screw R S, and slotted collar P, the parts being constructed and arranged substantially in the manner and for the purpose set forth.

In testimony of which invention I hereunto set my hand.

JOHN LEMMAN.

Witnesses:
FRANK MILLWARD,
ELITHA F. LAYMAN.